(12) United States Patent
Leavitt et al.

(10) Patent No.: US 9,205,690 B2
(45) Date of Patent: Dec. 8, 2015

(54) AUTOMATED CALIBRATION METHOD FOR ADDITIVE MANUFACTURING SYSTEM, AND METHOD OF USE THEREOF

(75) Inventors: Paul J. Leavitt, Minneapolis, MN (US); Paul H. Fuchs, Saint Louis Park, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 762 days.

(21) Appl. No.: 13/422,343

(22) Filed: Mar. 16, 2012

(65) Prior Publication Data

US 2013/0242317 A1 Sep. 19, 2013

(51) Int. Cl.
*B41J 29/38* (2006.01)
*B41J 29/393* (2006.01)
*B29C 67/00* (2006.01)

(52) U.S. Cl.
CPC ........... *B41J 29/393* (2013.01); *B29C 67/0055* (2013.01)

(58) Field of Classification Search
USPC ........... 264/13, 40.4, 113, 129, 401; 347/3, 4, 347/16
See application file for complete search history.

(56) References Cited

U.S. PATENT DOCUMENTS

| | | |
|---|---|---|
| 4,333,238 A | 6/1982 | McMurtry |
| 4,479,347 A | 10/1984 | Larsen et al. |
| 5,303,141 A | 4/1994 | Batchelder et al. |
| 5,312,224 A | 5/1994 | Batchelder et al. |
| 5,426,722 A | 6/1995 | Batchelder |
| 5,653,925 A | 8/1997 | Batchelder |
| 6,028,410 A | 2/2000 | Leavitt et al. |
| 6,067,480 A | 5/2000 | Stuffle et al. |
| 6,129,872 A | 10/2000 | Jang |
| 6,629,011 B1 | 9/2003 | Calderon et al. |
| 6,722,872 B1 | 4/2004 | Swanson et al. |
| 6,866,807 B2 | 3/2005 | Comb et al. |
| 6,869,559 B2 | 3/2005 | Hopkins |
| 6,998,087 B1 | 2/2006 | Hanson et al. |
| 7,127,309 B2 | 10/2006 | Dunn et al. |
| 7,229,144 B2 | 6/2007 | Nielsen et al. |
| 7,297,304 B2 | 11/2007 | Swanson et al. |
| 7,314,591 B2 | 1/2008 | Priedeman, Jr. |
| 7,384,255 B2 | 6/2008 | LaBossiere et al. |
| 7,625,200 B2 | 12/2009 | Leavitt |
| 7,680,555 B2 | 3/2010 | Dunn et al. |
| 7,744,364 B2 | 6/2010 | Turley et al. |
| 7,891,964 B2 | 2/2011 | Skubic et al. |
| 2005/0173838 A1 | 8/2005 | Priedeman, Jr. et al. |
| 2006/0111807 A1 | 5/2006 | Gothait et al. |
| 2007/0228590 A1 | 10/2007 | LaBossiere et al. |

(Continued)

FOREIGN PATENT DOCUMENTS

WO WO 2009088995 A1 7/2009

OTHER PUBLICATIONS

U.S. Appl. No. 13/242,561, filed Sep. 23, 2011.

*Primary Examiner* — Lam Nguyen
(74) *Attorney, Agent, or Firm* — Westman, Champlin & Koehler, P.A.

(57) ABSTRACT

A method for calibrating a print head for use in an additive manufacturing system, the method comprising positioning the print head over a calibration target, where the calibration target has a top surface with a plurality of edges. The method further comprising moving a tip of the print head to identify coordinate locations of the edges, and setting a calibration parameter for the print head.

8 Claims, 13 Drawing Sheets

(56) References Cited

U.S. PATENT DOCUMENTS

| | | |
|---|---|---|
| 2007/0228592 A1 | 10/2007 | Dunn et al. |
| 2008/0169585 A1 | 7/2008 | Zinniel |
| 2009/0035405 A1 | 2/2009 | Leavitt |
| 2010/0021580 A1 | 1/2010 | Swanson et al. |
| 2010/0100224 A1 | 4/2010 | Comb et al. |
| 2010/0283172 A1 | 11/2010 | Swanson |
| 2010/0327479 A1 | 12/2010 | Zinniel et al. |
| 2011/0074065 A1 | 3/2011 | Batchelder et al. |
| 2011/0076495 A1 | 3/2011 | Batchelder et al. |
| 2011/0076496 A1 | 3/2011 | Batchelder et al. |
| 2011/0117268 A1 | 5/2011 | Batchelder et al. |
| 2011/0121476 A1 | 5/2011 | Batchelder et al. |
| 2011/0220781 A1 | 9/2011 | Batchelder |
| 2012/0068378 A1 | 3/2012 | Swanson et al. |
| 2012/0070523 A1 | 3/2012 | Swanson et al. |
| 2012/0162314 A1 | 6/2012 | Swanson et al. |
| 2012/0164256 A1 | 6/2012 | Swanson et al. |

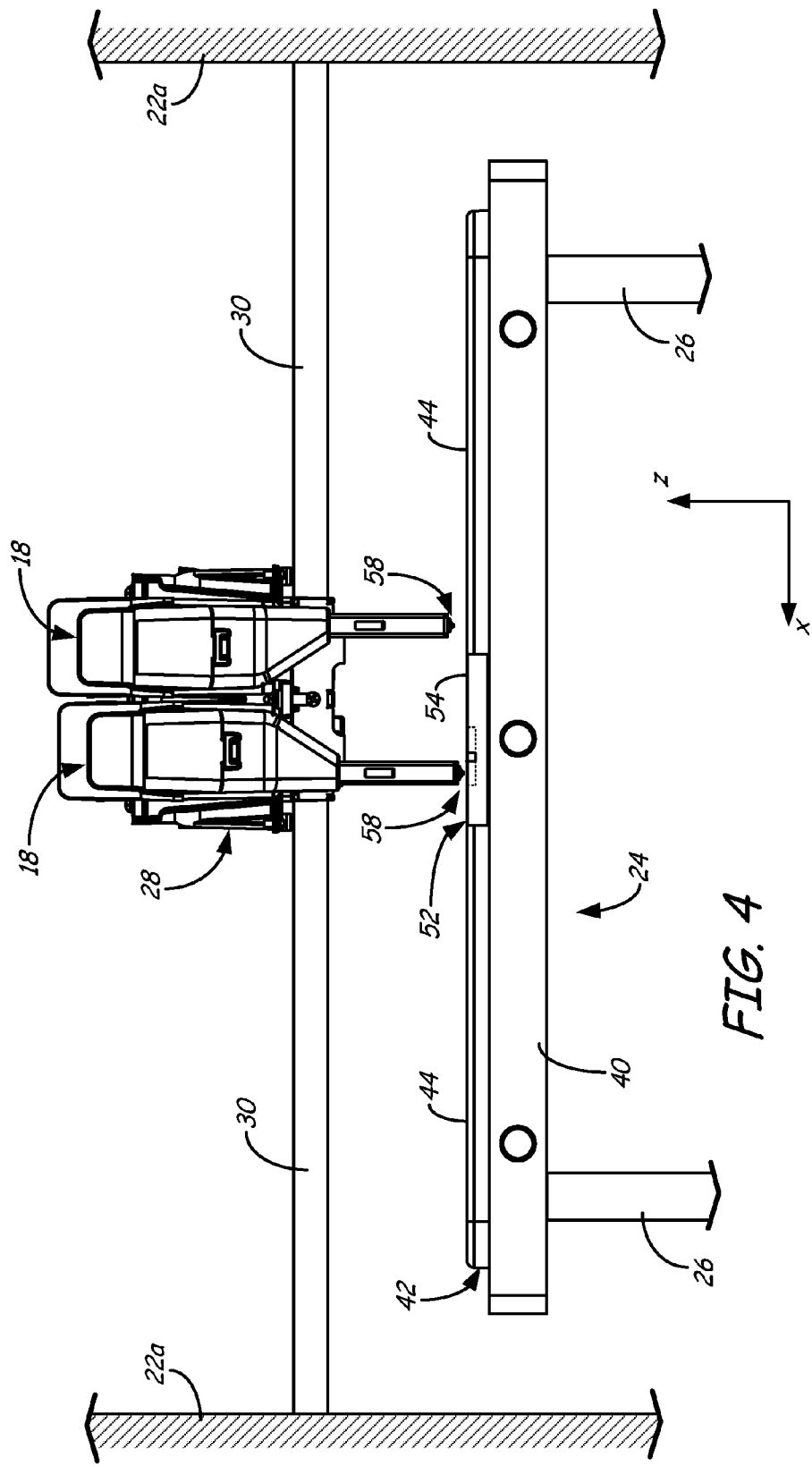

AUTOMATED CALIBRATION METHOD FOR ADDITIVE MANUFACTURING SYSTEM, AND METHOD OF USE THEREOF

BACKGROUND

The present disclosure relates to additive manufacturing systems for building three-dimensional (3D) parts with layer-based, additive manufacturing techniques. In particular, the present disclosure relates to methods for calibrating print heads for use in additive manufacturing systems.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a method for calibrating a print head for use in an additive manufacturing system. The method includes positioning the print head over a calibration target retained by a moveable platen of the additive manufacturing system, wherein the calibration target has a top surface with a plurality of edges. In some embodiments, the plurality of edges are defined by a grooved portion or an embossed portion of the top surface. The method also includes moving a tip of the print head along the top surface in a first direction until the tip drops off of a first edge of the plurality of edges, identifying a first coordinate location at the first edge where the tip dropped, moving the tip along the top surface in a second direction that is substantially perpendicular to the first direction until the tip drops off of a second edge of the plurality of edges, and identifying a second coordinate location at the second edge where the tip dropped. The method further includes determining a coordinate point of the calibration target based at least in part on the first coordinate location and the second coordinate location, and setting a calibration parameter for the print head in a horizontal plane based on the determined coordinate point.

Another aspect of the present disclosure is directed to a method for calibrating a print head for use in an additive manufacturing system, where the method includes biasing a tip of the print head against a top surface of a calibration target, moving the biased tip until the biased tip drops off of a first sidewall into a groove of the calibration target, and identifying a first coordinate location at which the biased tip dropped off of the first sidewall. The method also includes re-biasing the tip against the top surface of the calibration target, moving the re-biased tip until the re-biased tip drops off of a second sidewall into the groove, and identifying a second coordinate location at which the biased tip dropped off of the second sidewall. The method further includes determining a distance between the first coordinate location and the second coordinate location, and comparing the determined distance to a predetermined threshold value to determine whether an outer surface of the tip of the print head has accumulated material.

Another aspect of the present disclosure is directed to a method for calibrating print heads for use in an additive manufacturing system. The method includes calibrating tips of first and second print heads relative to a first calibration target, where the first calibration target is retained by a moveable platen of the additive manufacturing system. The method also includes calibrating the tips of first and second print heads respectively to second and third calibration targets, and performing at least a portion of a printing operation with the first and second print heads. The method further includes removing the first print head from the additive manufacturing system, inserting a third print head to the additive manufacturing system; and calibrating a tip of the third print head relative to the second calibration target to calibrate the third tip relative to the first calibration target.

BRIEF DESCRIPTION OF THE DRAWINGS

FIG. 4 is a rear view of the chamber of the system, where portions of a head carriage and a head gantry are omitted for ease of discussion.

DETAILED DESCRIPTION

The present disclosure is directed to a method for calibrating print heads for use in additive manufacturing systems, such as extrusion-based additive manufacturing systems. Additive manufacturing systems are typically capable of printing 3D parts and support structures with high resolutions. To attain these high resolutions, the print heads used to print the 3D parts and support structures require accurate positional calibrations. This is particularly, true with print heads that are removable and interchangeable. As discussed below, the calibration method of the present disclosure accurately calibrates print heads, including removable and interchangeable print heads. This allows the print heads to maintain proper registrations during the printing operations to print 3D parts and support structures with high resolutions.

Additionally, the calibration method of the present disclosure may be performed directly with print head tips, rather than with a separate calibration probe. This increases calibration accuracies, and precludes the need for a separate factory or manual calibration step to calibrate the print head tips relative to the probe. This also allows each print head to be removed and replaced with a new print head without requiring a separate calibration step to calibrate the new print head tip relative to the probe. Thus, the calibration method of the present disclosure may be performed in a fully automated manner.

Figure 1:
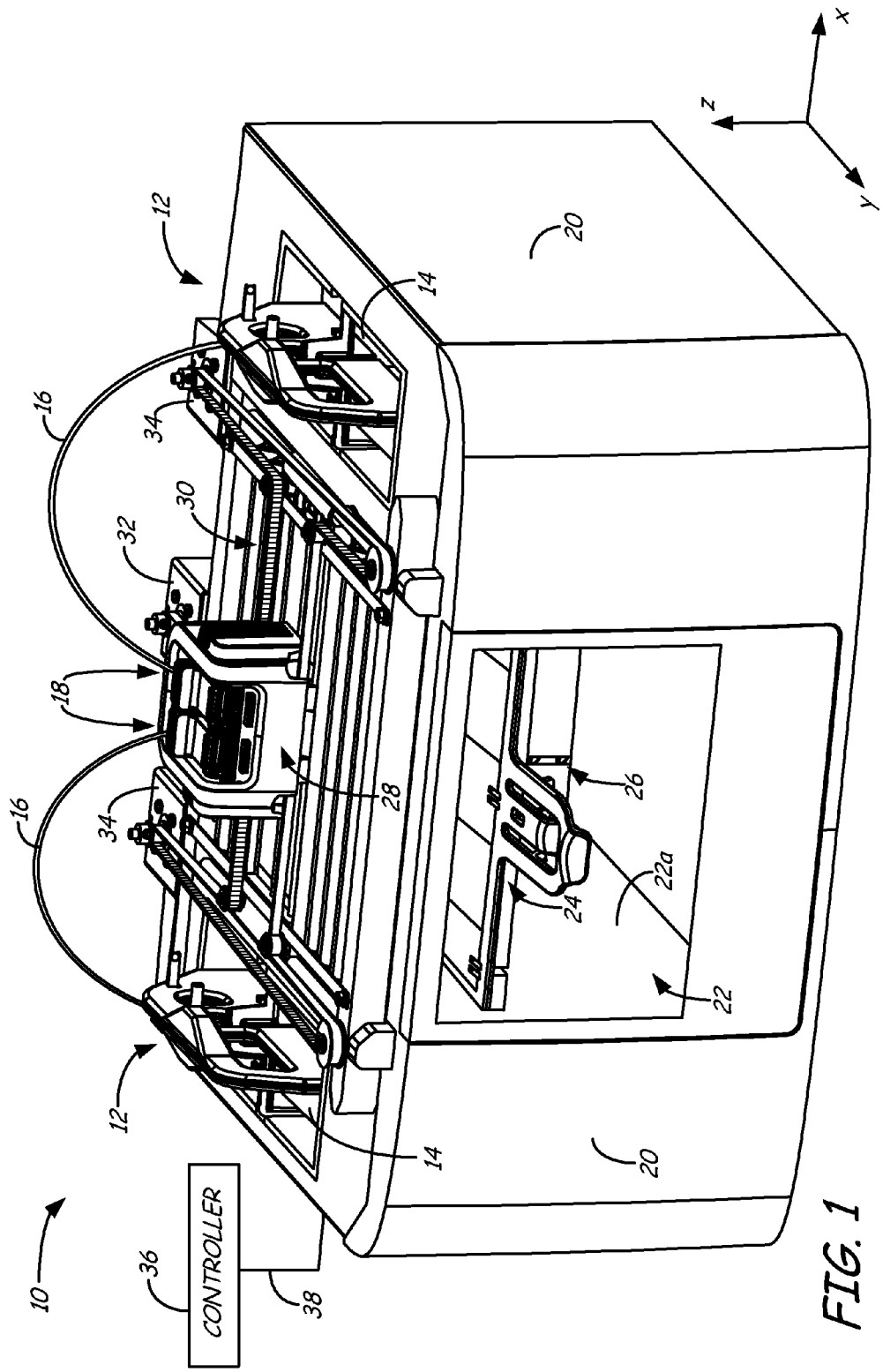
FIG. 1 is a top perspective view of an additive manufacturing system for printing 3D parts and support structures.

FIG. 1 shows system 10 in use with two consumable assemblies 12 of the present disclosure, which are examples of suitable components for performing the calibration method of the present disclosure. As shown, each consumable assembly 12 is an easily loadable, removable, and replaceable container device that retains a consumable filament for printing with system 10. Typically, one of the spool assemblies 12 contains a supply of part material filament ("part material spool assembly"), and the other consumable assembly 12 contains a supply of support material filament ("support material spool assembly"). However, both spool assemblies 12 may be identical in structure.

Each consumable assembly 12 includes container portion 14, guide tube 16, and print head 18, where container portion 14 retains a supply of a consumable filament. Guide tube 16 interconnects container portion 14 and print head 18 to supply successive segments of the filament from container portion 14 to print head 18.

System 10 is an additive manufacturing system for printing 3D parts or models and corresponding support structures from part and support material filaments, respectively, of spool assemblies 12, using a layer-based, additive manufacturing technique. Suitable additive manufacturing systems for system 10 include extrusion-based systems developed by Stratasys, Inc., Eden Prairie, Minn. under the trademarks "FDM" and "FUSED DEPOSITION MODELING".

System 10 includes system casing 20, chamber 22, platen 24, platen gantry 26, head carriage 28, head gantry 30, z-axis motor 32, and a pair of x-y motors 34. System casing 20 is a structural component of system 10 and may include multiple structural sub-components such as support frames, housing walls, and the like. In the shown embodiment, system casing 20 defines the dimensions of chamber 22.

Chamber 22 is an enclosed environment having chamber walls 22a, and which contains platen 24 for printing 3D parts and support structures. Chamber 22 may be heated (e.g., with circulating heated air) to reduce the rate at which the part and support materials solidify after being extruded and deposited (e.g., to reduce distortions and curling). In alternative embodiments, chamber 22 may be omitted and/or replaced with different types of build environments. For example, a 3D part and support structure may be built in a build environment that is open to ambient conditions or may be enclosed with alternative structures (e.g., flexible curtains).

Platen 24 is a platform on which the 3D parts and support structures are printed in a layer-by-layer manner, and is supported by platen gantry 26. Platen gantry 26 is a gantry assembly configured to move platen 24 along (or substantially along) the vertical z-axis and is powered by z-axis motor 32.

Head carriage 28 is a unit configured to receive one or more removable print heads, such as print heads 18, and is supported by head gantry 30. Examples of suitable devices for head carriage 28, and techniques for retaining print heads 18 in head carriage 28, include those disclosed in Swanson et al., U.S. patent application Ser. No. 12/976,111 and Ser. No. 13/332,530; Swanson, U.S. Patent Application Publication No. 2010/0283172; and Swanson, International Publication No. WO2009/088995.

Head gantry 30 is a belt-driven gantry assembly configured to move head carriage 28 (and the retained print heads 18) in (or substantially in) a horizontal x-y plane above chamber 22, and is powered by x-y motors 34. Examples of suitable gantry assemblies for head gantry 30 include those disclosed in Comb et al., U.S. Ser. No. 13/242,561.

System 10 also includes controller 36, which is one or more processor-based controllers that may communicate over communication line 38 with print heads 18, chamber 22 (e.g., with a heating unit for chamber 22), head carriage 28, motors 34, and various sensors, display devices, and/or user input devices. In some embodiments, controller 36 may also communicate with one or more of platen 24, platen gantry 26, head gantry 30, and any other suitable component of system 10. Controller 36 may include any suitable computer-based processor, computer-storage media (e.g., volatile and non-volatile media), and related components for operating system 10.

While illustrated as a single signal line, communication line 38 may include one or more electrical, optical, and/or wireless signal lines, allowing controller 36 to communicate with various components of system 10. Furthermore, while illustrated outside of system 10, controller 36 and communication line 38 may be internal components to system 10.

During operation, controller 36 directs z-axis motor 32 and platen gantry 26 to move platen 24 to a predetermined height within chamber 22. Controller 36 then directs motors 34 and head gantry 30 to move head carriage 28 (and the retained print heads 18) around in the horizontal x-y plane above chamber 22. As discussed below, prior to performing a print operation, controller 36 may direct system 10 to calibrate each print head 18 in the x-y-z-coordinate system (or any suitable coordinate system) relative to platen 24.

In the example shown in FIG. 1, the horizontal x-y plane is a horizontal plane defined by the x-axis and the y-axis, where the x-axis, the y-axis, and the vertical z-axis are orthogonal to each other. As used herein, terms referring to movement along an axis, such as along the "x-axis", "along the y-axis", "along the z-axis", and the like refer to movements that are either parallel to the given axis or are co-linear with the given axis. The shown orientations of the x-axis, the y-axis, and the z-axis are provided for ease of discussion, and are not intending to be limiting on any particular orientations for system 10. For example, system 10 may operate in a x-y-z coordinate system in which the x-axis, the y-axis, and the z-axis are each inverted from the orientations shown in FIG. 1, such that the x-axis and the y-axis define a horizontal plane, and the z-axis is a vertical axis.

After calibration, controller 36 may direct print heads 18 to selectively draw successive segments of the filaments from container portions 14 and through guide tubes 16, respectively. Each print head 18 thermally melts the successive segments of the received filament such that it becomes a molten material, thereby allowing the molten material to be extruded and deposited onto platen 24 for printing a 3D part and a support structure in a layer-by-layer manner. After the print operation is complete, the resulting 3D part and support structure may be removed from chamber 22, and the support structure may be removed from the 3D part. The 3D part may then undergo one or more additional post-processing steps.

Figure 2:
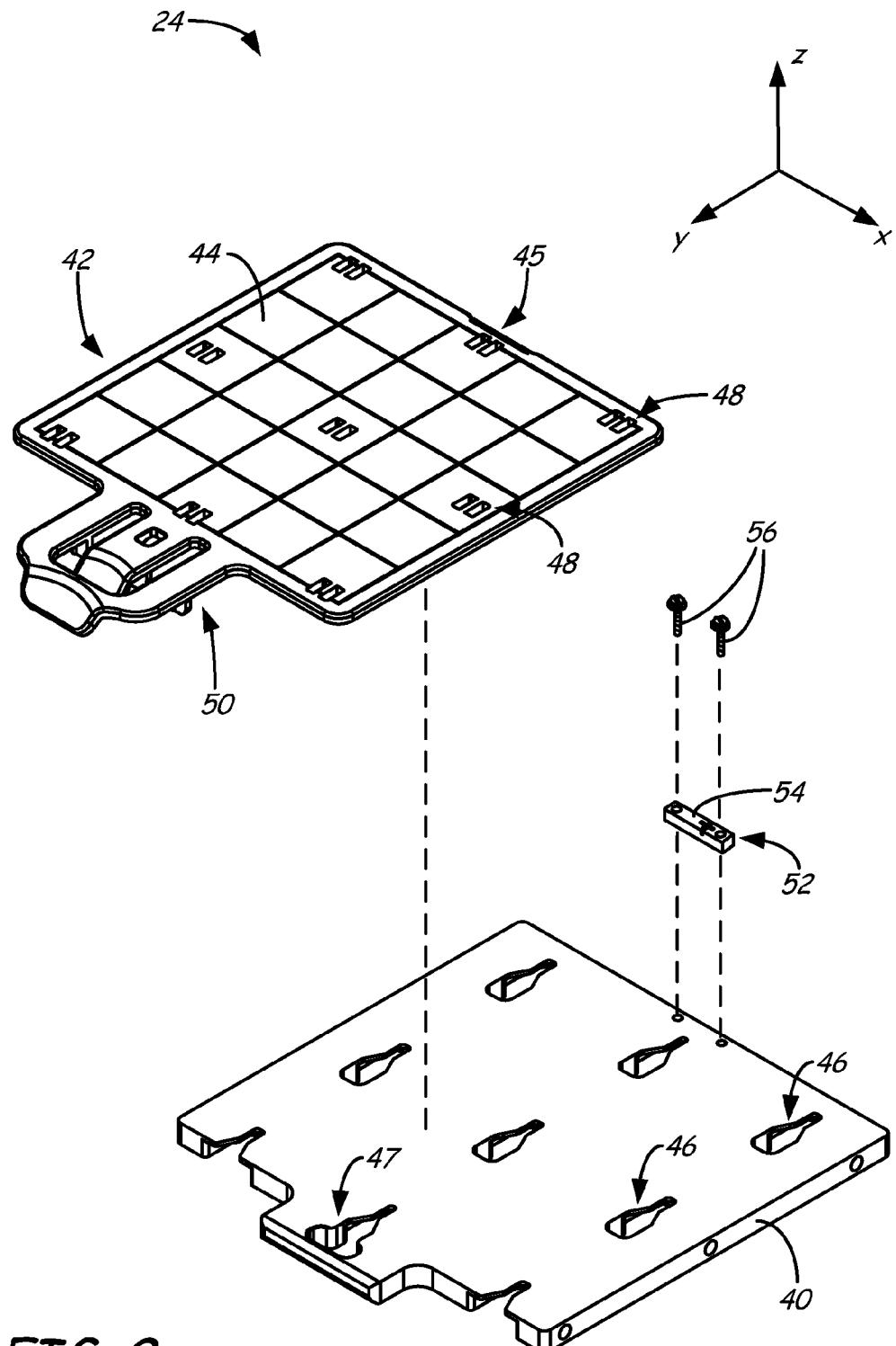
FIG. 2 is an exploded top perspective view of a platen of the additive manufacturing system, illustrating a common target for performing a calibration method of the present disclosure.
Figure 3:
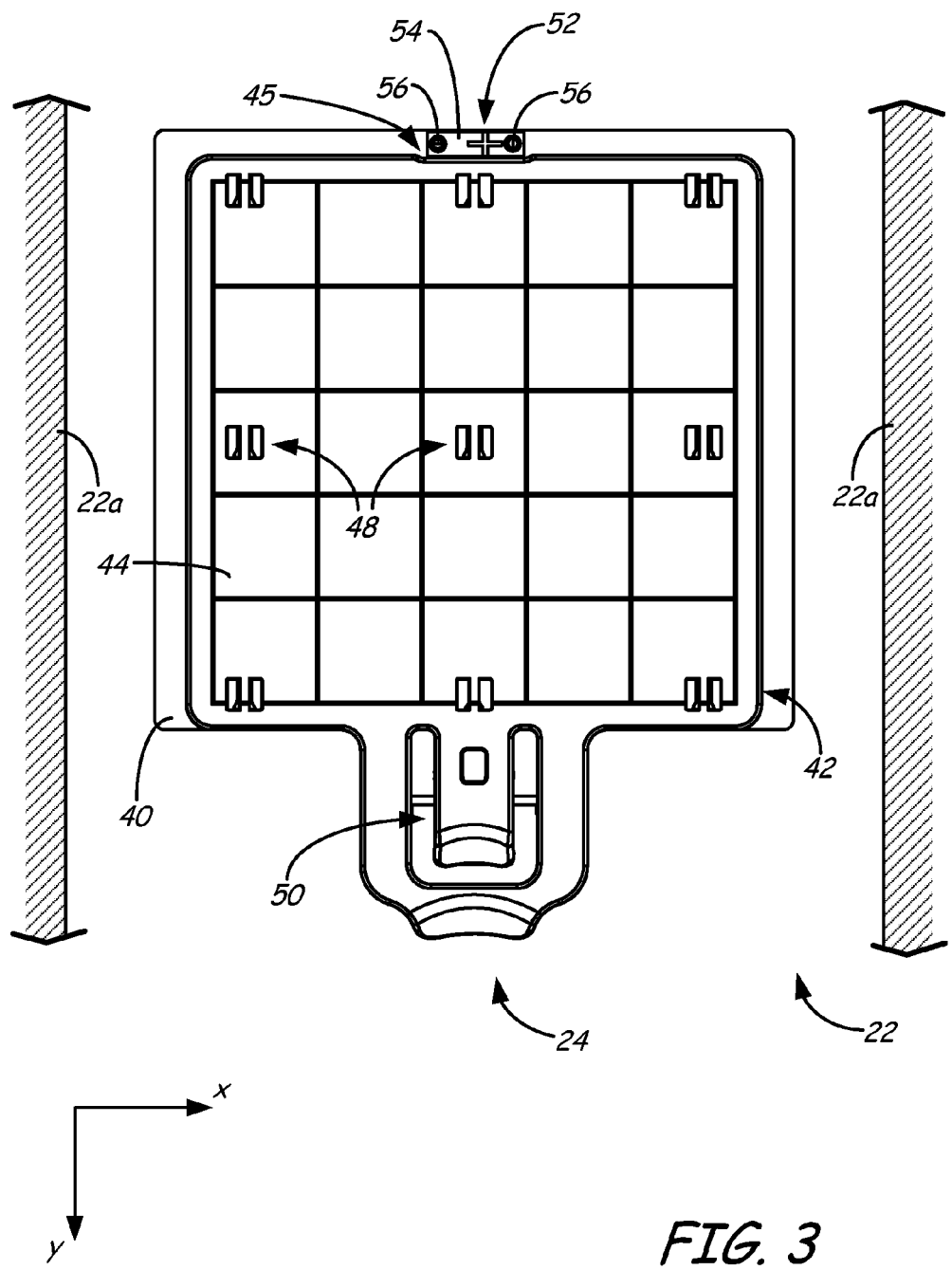
FIG. 3 is a top view of a chamber of the system, further illustrating the platen.

FIGS. 2-4 illustrate the interior environment of chamber 22 for performing the calibration method of the present disclosure, as well as printing operations. As shown in FIG. 2, platen 24 includes base platform 40 and tray 42, where base platform 40 is retained by platen gantry 26 (shown in FIG. 1). In the shown embodiment, tray 42 includes tray surface 44 and rear indentation 45, and is removable and replaceable relative to base platform 40, such as disclosed in Dunn et al., U.S. Pat. No. 7,127,309. For example, in the shown embodiment, base platform 40 includes keyholes 46 and locking hole 47, and tray 42 includes male extensions 48 and clip handle 50. Male extensions 48 extend downward from tray 42 for insertion into keyholes 46. Correspondingly, clip handle 50 inserts into locking hole 47 to secure tray 42 to base platform 40 during use in system 10.

Platen 24 also includes common target 52 (having top surface 54 and a plurality of edges), which is secured to a rear portion of base platform 40 with fasteners 56, adjacent to rear indentation 45 of tray 42. This prevents tray 42 and common target 52 from moving relative to platform assembly 40, and to each other. As shown in FIG. 3, common target 52 is a suitable component for performing the calibration method of the present disclosure to calibrate print heads 18 (shown in FIG. 1) relative to tray 42 in the horizontal x-y plane, as well as along the vertical z-axis.

In the example shown in FIG. 4, top surface 54 of common target 52 is substantially planar with tray surface 44 of tray 42. The terms "about" and "substantially" are used herein with respect to measurable values and ranges due to expected variations known to those skilled in the art (e.g., limitations and variabilities in measurements). As such, when the tips of print heads 18 (referred to as tips 58) are calibrated along the vertical z-axis with common target 52, the same vertical calibration may also apply to tray surface 44.

In alternative embodiments, top surface 54 of common target 52 may be positioned a small distance higher or lower than tray surface 44 of tray 42, so long as the height difference is a known value. In further alternative embodiments, the calibrations of tips 58 along the vertical z-axis may be made at one or more locations of tray surface 44 of tray 42 to provide an accurate vertical calibration profile for tips 58.

In further alternative embodiments, a first print head 18 may print a common target on tray 42 for use in calibrating a second print head 18, and vice versa. Thus, print heads 18 may print a pair of common targets for their respective calibrations relative to tray 42, where each printed common target may function in the same manner as common target 52.

As discussed in Swanson et al., U.S. patent application Ser. No. 12/976,111 and Ser. No. 13/332,530, print heads 18 are configured to be individually toggled up and down to move tips 58 between raised and lowered positions. As illustrated in FIG. 4, when one tip 58 is at its lowered position, the other tip 58 is typically at its raised position to prevent the raised tip 58 from interfering with the printing operation. As discussed below, this toggling may be used in conjunctions with common target 52 to calibrate each tip 58 relative to tray 42 in the horizontal x-y plane, as well as along the vertical z-axis (i.e., tip-to-substrate calibration). Additionally, when both tips 58 are calibrated with common target 52, this dual calibration also provides a tip-to-tip calibration between tips 58 in the horizontal x-y plane, as well as along the vertical z-axis.

FIGS. 5A-5D illustrate the calibration method of the present disclosure to individually calibrate each print head 18 relative to tray 42 with the use of common target 52. To find common target 52, controller 36 may move head carriage 28 (retaining print heads 18) to a known location in the x-y plane. For example, controller 36 may move head carriage 28 to a front corner of chamber 22. From there, head carriage 28 may be moved by a predetermined vector to position one of tips 58 over common target 52, as illustrated by arrow 60 in FIG. 5A. Additionally, platen 24 is raised or otherwise positioned along the vertical z-axis such that tip 58 may contact surface 54 when print head 18 is toggled downward.

Figure 5A:
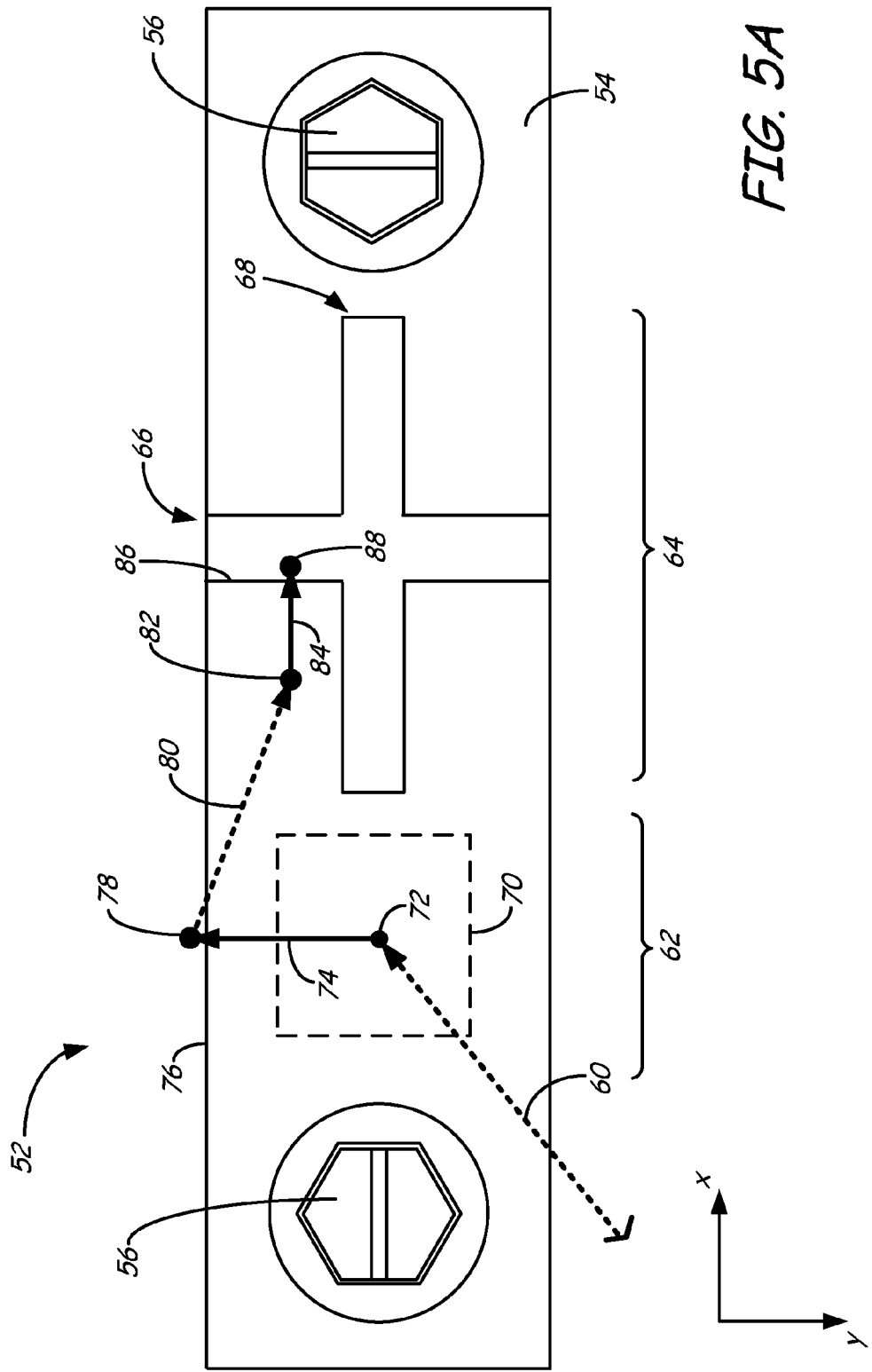
FIG. 5A is a top view of the common target, illustrating a first portion of the calibration method of the present disclosure.

As shown in FIG. 5A, common target 52 includes planar portion 62 and grooved portion 64, located between fasteners 56. Planar portion 62 is a section of top surface 54 that may be substantially flush with tray surface 44 of tray 42. Grooved portion 64 includes groove 66 extending along the y-axis, and groove 68 extending along the x-axis. Grooves 66 and 68 are indentations from top surface 54 that are perpendicular to each other to define a cross-shaped pattern having a plurality of drop-off edges.

As illustrated by arrow 60, the predetermined vector provides a rough positioning of tip 58 over common target 52, within region 70. Print head 18 is then toggled down such that tip 58 presses against top surface 54 within region 70, as illustrated by point 72. As illustrated by arrow 74, tip 58 is then moved across top surface 54 in a rearward direction along the y-axis, which is perpendicular to the rear edge of common target 52 (referred to as rear edge 76).

During this movement across top surface 54, tip 58 may be continuously biased across top surface 54, or may be intermittently biased (i.e., tapped by toggling up and down in small increments) while moving across top surface 54. When tip 58 reaches rear edge 76, the downward bias on tip 58, due to the downward toggling of print head 18, causes tip 58 to drop off of rear edge 76 to its lowered position. Print head 18 and/or controller 36 identify this location along the y-axis, referred to as point 78, and print head 18 is toggled upward to lift tip 58 to its raised position. Print head 18 and/or controller 36 may identify toggles, biasing, and drops with the use of any suitable mechanism, such as a linear encoder (not shown) that monitors the elevation of print head 18 relative to head carriage 28.

Print head 18 is then moved along predetermined vector 80 above top surface 54, and is then toggled down such that tip 58 presses against top surface 54, as illustrated by point 82. As illustrated by arrow 84, tip 58 is then moved across top surface 54 in a rightward direction along the x-axis, which is perpendicular to left sidewall 86 of groove 66. When tip 58 reaches sidewall 86, the downward bias on tip 58 causes tip 58 to drop off of sidewall 86 and into groove 66. Print head 18 and/or controller 36 identify this location along the x-axis, referred to as point 88, and print head 18 is then toggled upward to lift tip 58 to its raised position.

Figure 5B:
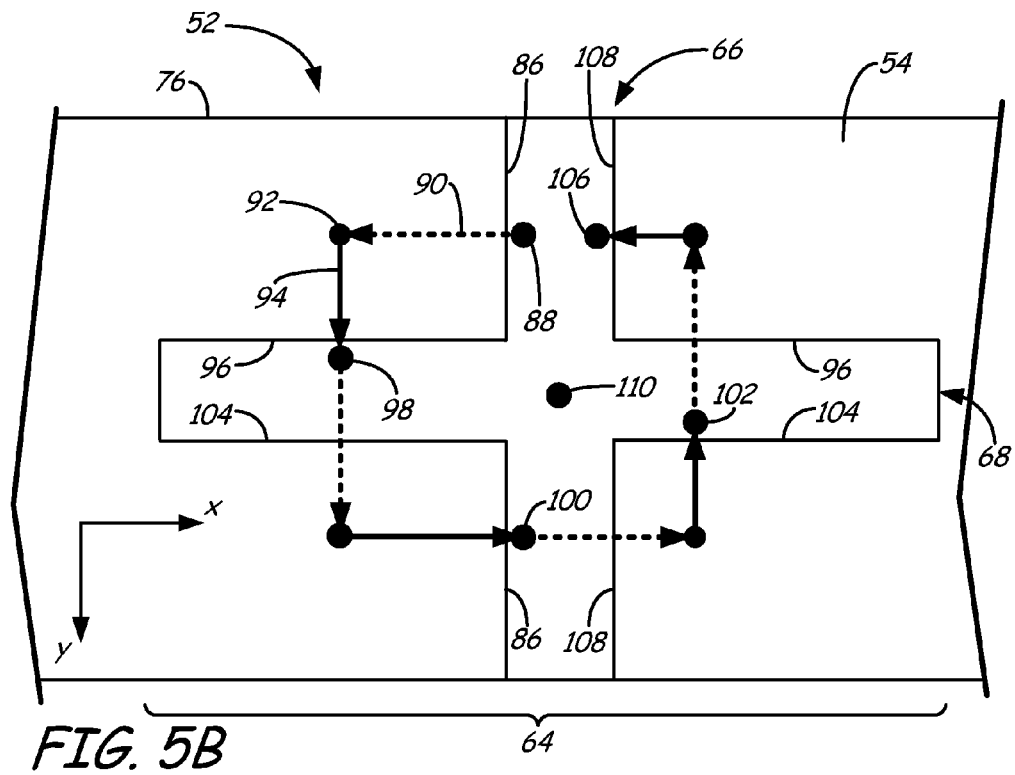
FIG. 5B is an expanded top view of a groove portion of the common target, illustrating a second portion of the calibration method of the present disclosure.

As shown in FIG. 5B, print head 18 is then moved leftward along the x-axis by predetermined vector 90 above top surface 54, and is then toggled down such that tip 58 presses against top surface 54, as illustrated by point 92. As illustrated by arrow 94, tip 58 is then moved across top surface 54 in a forward direction along the y-axis, which is perpendicular to rear sidewall 96 of groove 68. When tip 58 reaches sidewall 96, the downward bias on tip 58 causes tip 58 to drop off of sidewall 96 and into groove 68. Print head 18 and/or controller 36 identify this location along the y-axis, referred to as point 98, and print head 18 is then toggled upward to lift tip 58 to its raised position.

This process is then repeated in the shown counter-clockwise pattern around grooves 66 and 68 to define point 100 (at left sidewall 86), point 102 (at front sidewall 104), and point 106 (at right sidewall 108). Controller 36 may then average the y-axis values of points 98 and 102, and average the x-axis values of points 100 and 106 to identify central point 110, which is an averaged point in the horizontal x-y plane. Controller 36 may then set central point 110 as the zeroed-coordinate location (x=0, y=0) in the horizontal x-y plane.

Figure 5C:
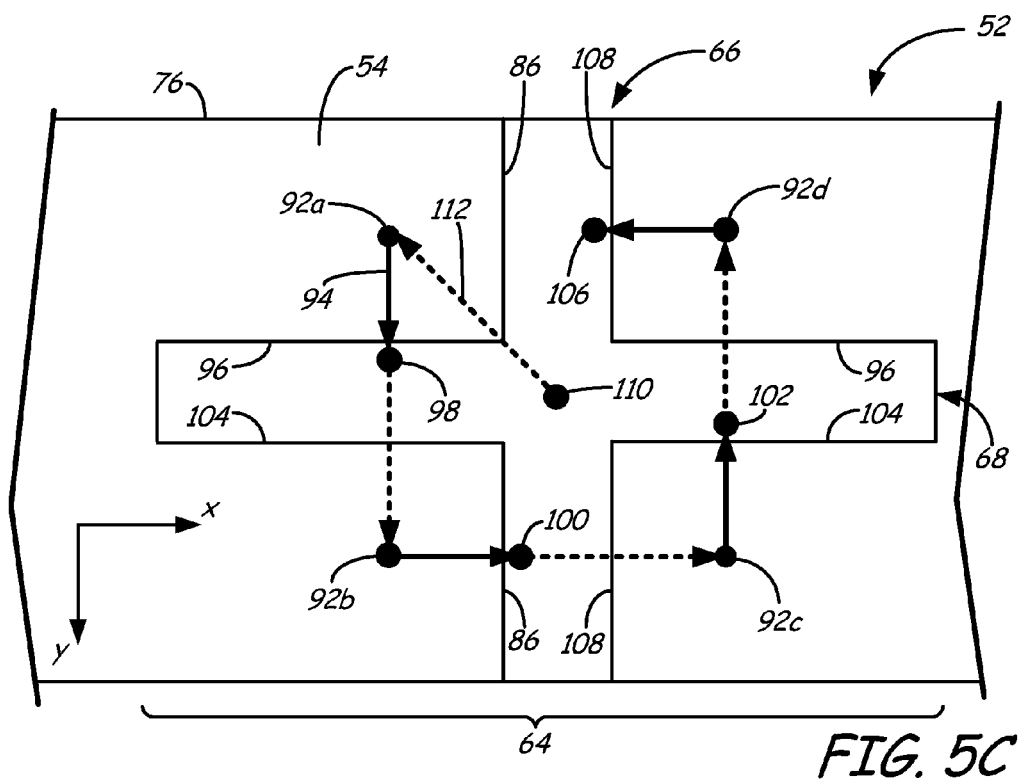
FIG. 5C is an expanded top view of the groove portion of the common target, illustrating a third portion of the calibration method of the present disclosure.

As shown in FIG. 5C, print head 18 may then be raised and moved along predetermined vector 112 above top surface 54, and is then toggled down such that tip 58 presses against top surface 54, as illustrated by updated point 92a (e.g., at −x1, −y1). The above-discussed process illustrated in FIGS. 5A and 5B may then be repeated again in a counter-clockwise pattern around grooves 66 and 68, such as illustrated by updated point 92b at (−x1, y1), by updated point 92c at (x1, y1), and by updated point 92d at (x1, −y1), to update central point 110. This process may be repeated a predetermined number of times, or, alternatively, until the change in value for central point 110 between successive measurements falls below a threshold error value. The resulting central point 110 is then the horizontal x-y calibration value for the given print head 18 relative to tray 42.

Figure 5D:
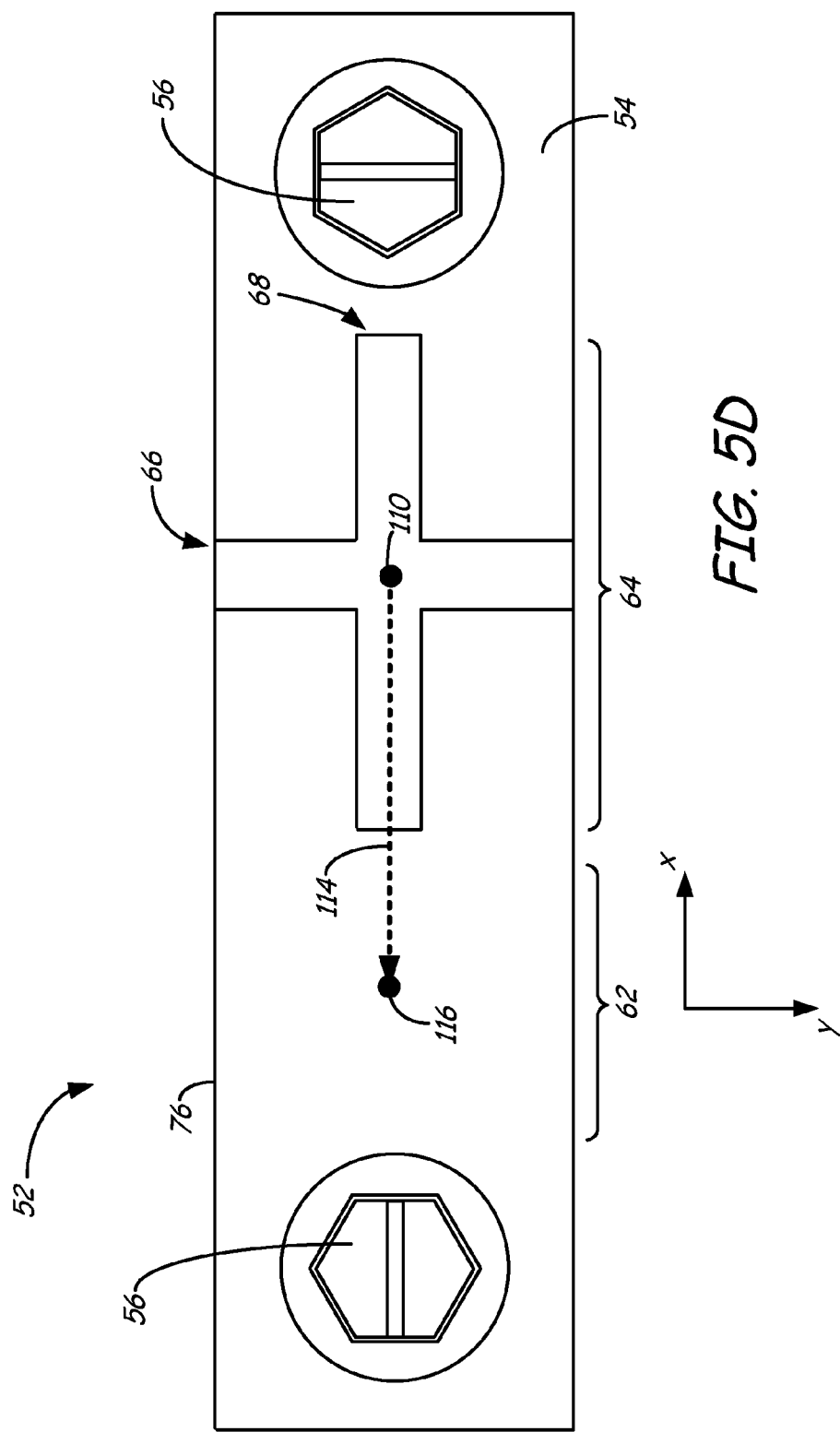
FIG. 5D is a top view of the common target, illustrating a fourth portion of the calibration method of the present disclosure.

As shown in FIG. 5D, print head 18 may then be raised and moved leftward along the x-axis by predetermined vector 114 above top surface 54. Print head 18 is then toggled down until tip 58 contacts top surface 54, as illustrated by point 116. Controller 36 may identify this contact location along the z-axis, which is the vertical z-axis calibration value for the given print head 18 relative to tray 42. As discussed above, the vertical z-axis calibration may alternatively be performed on tray surface 44 itself.

Figure 6A:
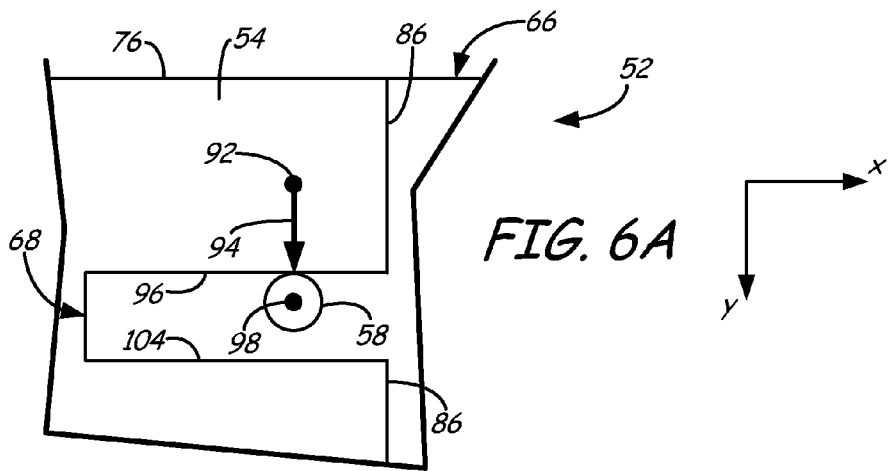
FIGS. 6A and 6B are expanded top views of a rear left section of the groove portion of the common target, illustrating a technique for detecting material accumulated on a print head tip.

As can be appreciated, the above-discussed calibration method is dependent on the diameter of each tip 58. For example, as shown in FIG. 6A, when tip 58 drops off of sidewall 96 into groove 68, the drop-off point 98 may be set at the central axis of tip 58. In other words, print head 18 and/or controller 36 may recognize that point 98 is offset from sidewall 96 by the radius of tip 58.

Figure 6B:
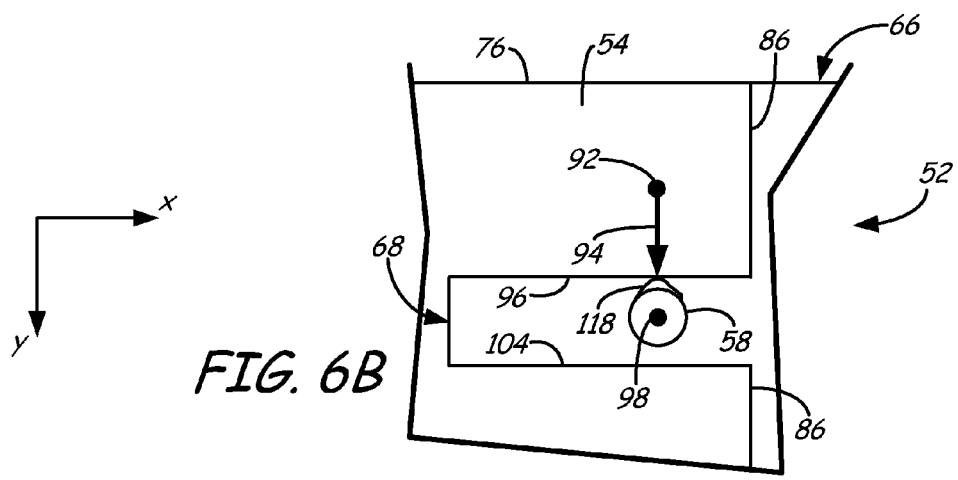

However, as shown in FIG. 6B, during printing operations, residues of part and/or support materials may potentially adhere and accumulate on the outer-diameter surface of tip 58 (illustrated by accumulated material 118). In this situation, tip 58 drops off of sidewall 96 at a location that is further from sidewall 96 than the radius of tip 58. This can result in a calibration error for the given tip 58, which may result in registration misalignment along the y-axis.

Figure 6C:
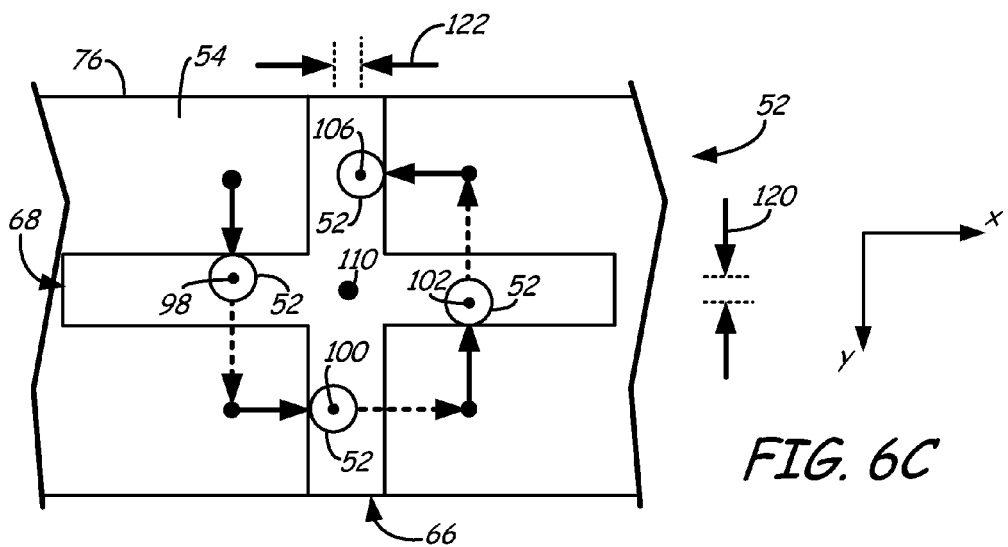
FIG. 6C is an expanded top view of the groove portion of the common target, further illustrating the technique for detecting material accumulated on the print head tip.

As shown in FIG. 6C, common target 52 may also be used to determine whether accumulated materials (accumulated material 118) are adhered to the outer diameter surface of each tip 58. For example, when controller 36 averages the y-axis values of points 98 and 102 to identify central point 110, controller 36 may also compare the y-axis values of points 98 and 102 to determine whether the distance between points 98 and 102 along the y-axis (referred to as distance 120) is less than a predetermined threshold value. This predetermined threshold value is based on the known diameter of tip 58 and the known width of groove 68.

Similarly, controller 36 may also compare the x-axis values of points 100 and 106 to determine whether the distance between points 100 and 106 along the x-axis (referred to as distance 122) is less than a predetermined threshold value. This predetermined threshold value is also based on the known diameter of tip 58 and the known width of groove 66, and may be the same as the predetermined threshold value for distance 120 if grooves 66 and 68 have the same widths.

If either distance 120 or distance 122 is less than its respective predetermined threshold value, this signifies that materials may be adhered to the outer diameter surface of tip 58. In effect, the predetermined threshold value corresponds to an outer diameter threshold for tip 58, which, if exceeded, signifies that materials may be adhered to the outer diameter surface of tip 58. Controller 36 may then direct print head 18 to undergo a tip cleaning operation, such as with a tip cleaning assembly disclosed in Turley et al., U.S. Pat. No. 7,744,364. Alternatively, controller 36 may direct system 10 to halt operation until a user of system 10 cleans tip 58. After tip 58 is cleaned, the given print head 18 may then undergo the above-discussed calibration method.

In typical printing operations with system 10, tips 58 each only require a single calibration for maintaining registration during an entire printing operation (e.g., to print an entire 3D part and corresponding support structure). However, as discussed above, print heads 18 may be individually removed and replaced, such as when one or both of the consumable assemblies 12 exhaust their supplies of consumable filaments. In this situation, the previous calibration parameters may not necessarily be correct for a replaced print head.

Figure 7:
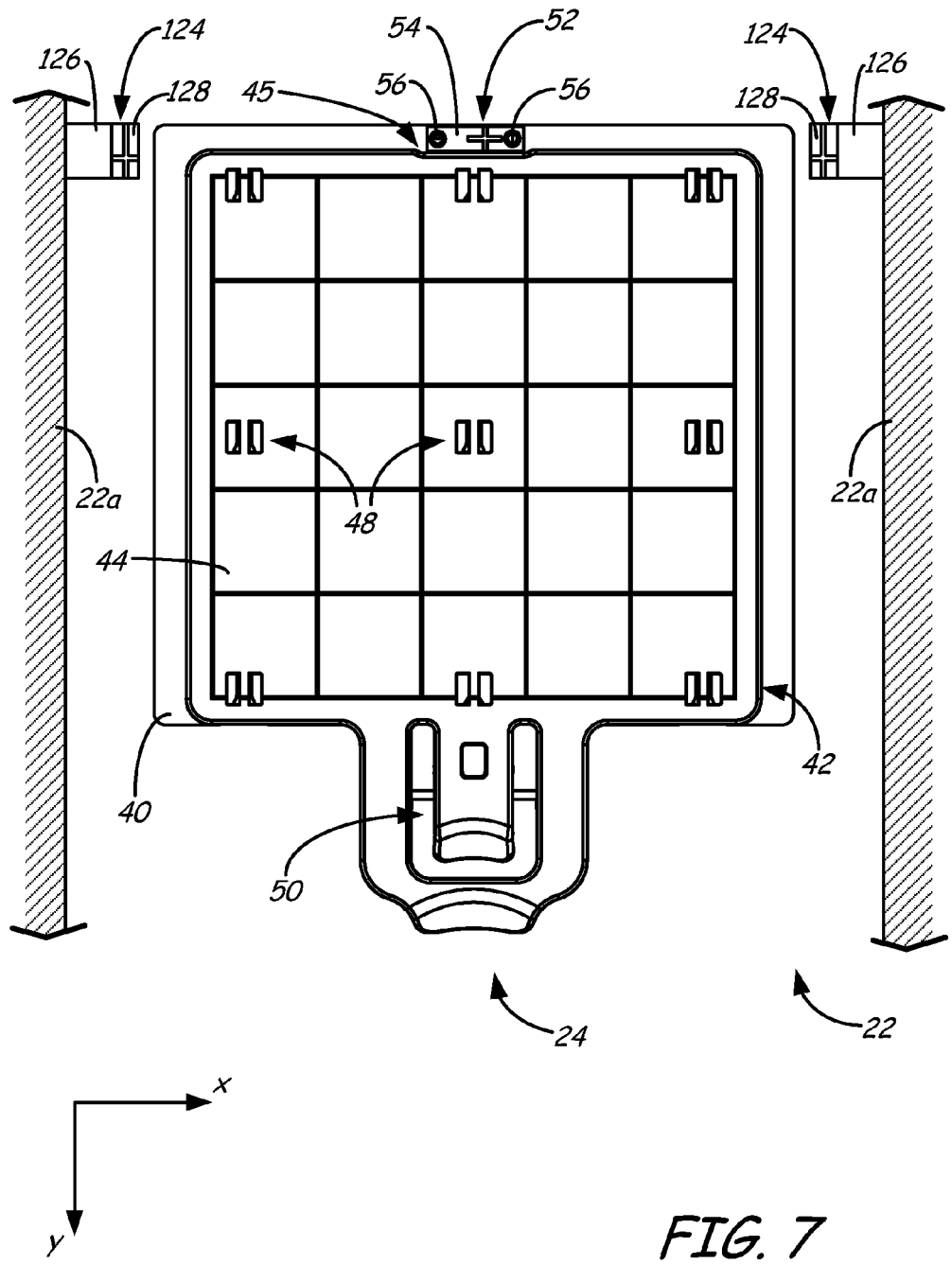
FIG. 7 is a top view of a chamber of the system, illustrating a second embodiment of the present disclosure, which further includes a pair of side targets.

FIGS. 7-10 illustrate a second embodiment to system 10, which allows print heads 18 to be recalibrated part way through printing operations, such as when one or both of print heads 18 are removed and replaced. As shown in FIG. 7, in this embodiment, system 10 also includes a pair of side targets 124 offset along the x-axis, which are secured to the chamber walls 22a with any suitable structures, such as brackets 126. Side targets 124 (having top surfaces 128) and brackets 126 may be located at any suitable location along the y-axis between the front and rear ends of chamber 22.

Figure 8:
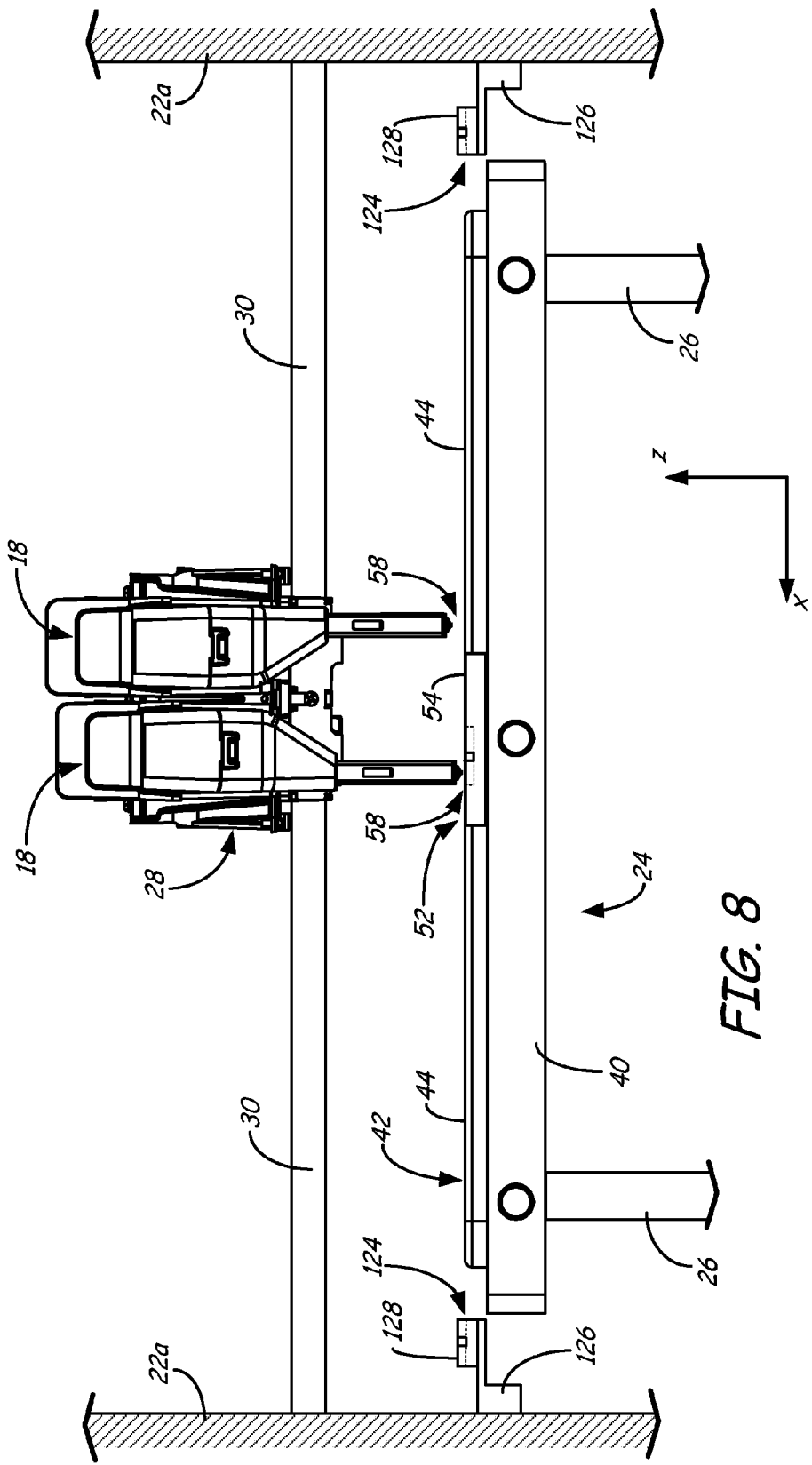
FIG. 8 is a rear view of the chamber of the system, where portions of a head carriage and a head gantry are omitted for ease of discussion, which further illustrates the second embodiment of the present disclosure.

As shown in FIG. 8, brackets 126 desirably offset side targets 124 along the x-axis at suitable distances to allow tips 58 of the respective print heads 18 to laterally reach side targets 124. Side targets 124 are also desirably offset along the x-axis from platen 24 to prevent platen 24 from colliding with side targets 124 as platen gantry 26 moves platen 24 along the vertical z-axis. Furthermore, top surfaces 128 of side targets 124 may be positioned higher than top surface 54 of common target 52, while also being lower than the heights of tips 58 at their raised positions. This allow the raised tips 58 to pass over side targets 124. Examples of suitable vertical distances between top surfaces 128 of side targets 124 and top surface 54 of common target 52 range from zero inches to about 0.05 inches.

Figure 9:
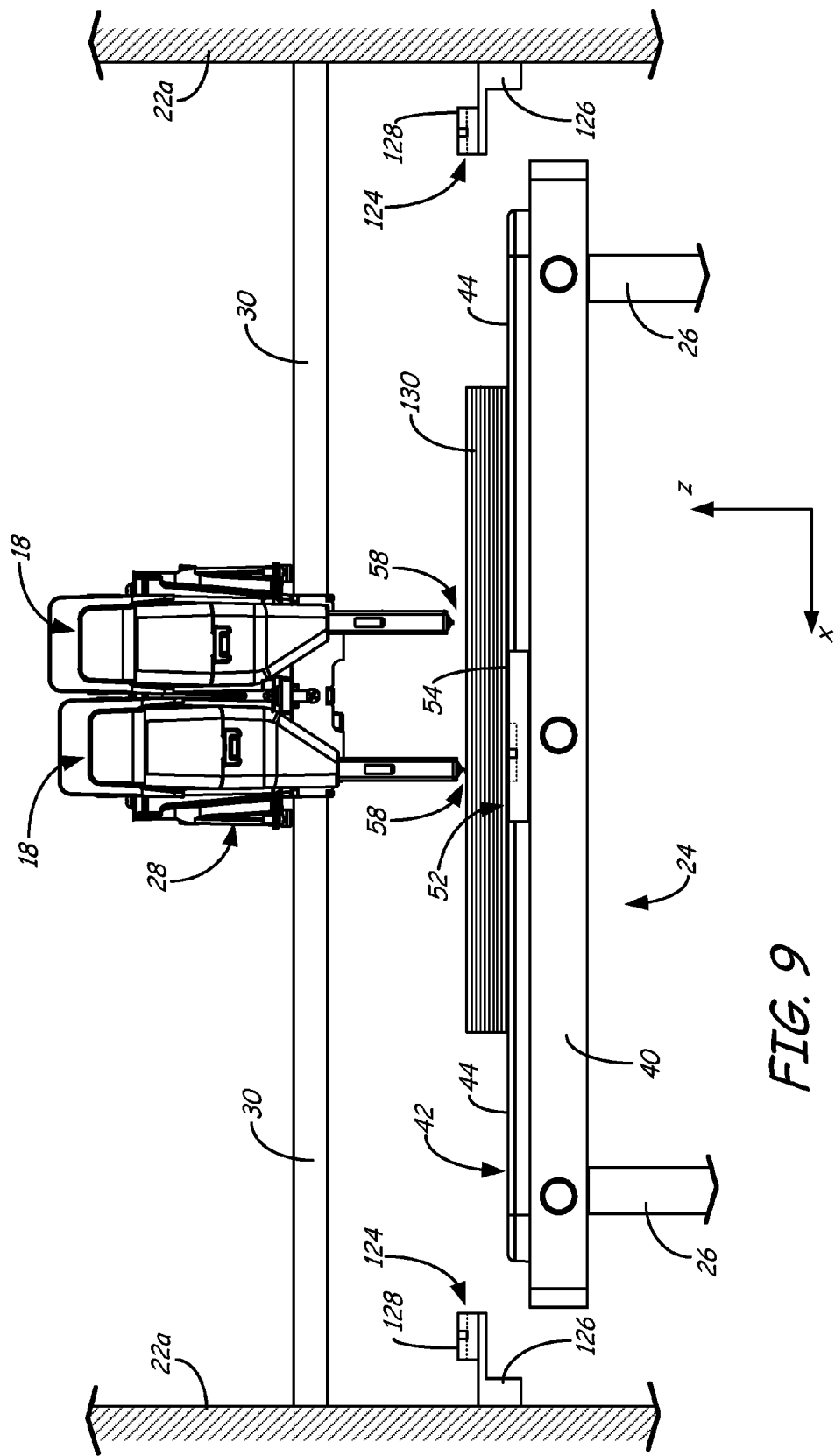
FIG. 9 is a rear view of the chamber of the system as shown in FIG. 8 after several layers are printed.

As shown in FIG. 9, during a printing operation, layers of part and/or support materials are printed on tray 42 (referred to as layers 130). After each layer is printed, platen 24 (including base platform 40 and tray 42) is lowered along the z-axis by a single known increment. As can be appreciated, after a few printed layers, tips 58 of print heads 18 can no longer reach top surface 54 of common target 52. This prevents print heads 18 from being recalibrated with common target 52 if print heads 18 are replaced part way through a printing operation.

In one embodiment, controller 36 may prevent system 10 from operating if the amount of consumable filament in either consumable assembly 12 is less than an expected consumption for a particular 3D part or support structure. Alternatively, after calibrating print heads 18 with common target 52, as discussed above, print heads 18 may then be calibrated relative to their respective side targets 124. This correspondingly calibrates side targets 124 relative to common target 52 and tray 42, allowing calibrations that are needed part way through a printing operation to be performed with side targets 124.

Figure 10:
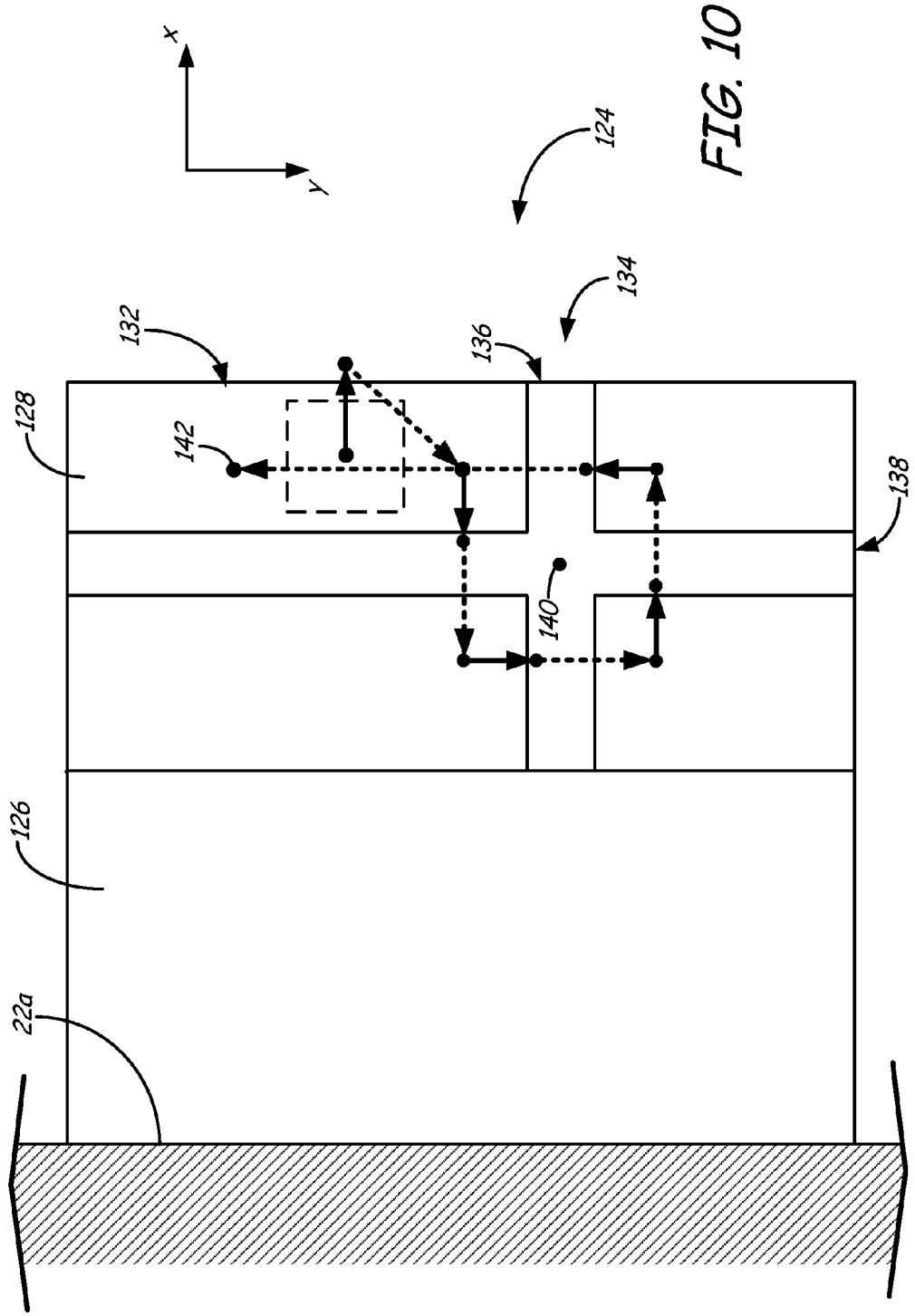
FIG. 10 is a top view of one of the side targets, illustrating the calibration method of the present disclosure pursuant to the second embodiment.

As shown in FIG. 10, each side target 124 includes planar portion 132 and grooved portion 134, where planar portion 132 is a section of top surface 128. Grooved portion 134 includes groove 136 extending along the x-axis, and groove 138 extending along the y-axis, which may function in the same manner as grooves 66 and 68 of common target 52.

After tips 58 are calibrated relative to common target 52, each tip 58 may then be calibrated relative to its respective side target 124, using the same calibration method as discussed above for common target 52. This identifies central point 140, which is the horizontal x-y calibration value for the given print head 18 relative to its side target 124. The coordinate differences between central point 110 of common target 52 and central points 140 of side targets 124 define the respective offset vectors for calibrating side targets 124 relative to common target 52 and tray 42 in the horizontal x-y plane.

Similarly, each print head 18 may also be raised and moved rearward along the y-axis by a predetermined vector above top surface 128, and then toggled down until tip 58 contacts top 128, such as at point 142. Controller 36 may then identify this contact location along the z-axis, which is the vertical z-axis calibration value for the given print head 18 relative to its respective side target 124. The differences between the z-axis value of top surface 54 of common target 52 (e.g., at point 116, shown in FIG. 5D) and the z-axis values of top surfaces 128 of side targets 124 (e.g., at points 142) define the respective offset vectors for calibrating side targets 124 relative to common target 52 and tray 42 along the vertical z-axis.

Once print heads 18 are calibrated relative to common target 52, and side targets 124 are calibrated relative to print heads 18 (and hence, to common target 52), if either print head 18 is subsequently removed part way through a printing operation, a replacement print head 18 may then be calibrated relative to its respective side target 124. The elevated locations of side targets 124 allow each print head 18 to be recalibrated regardless of the number of part or support material layers (e.g., layers 130, shown in FIG. 9) already printed on tray 42. Because each side target 124 is calibrated relative to common target 52, once the replaced print head 18 is calibrated relative to its respective side target 124, it is then also calibrated relative to common target 52 and tray 42. This allows the given print head 18 to print subsequent layers of part or support materials with proper layer registrations.

Additionally, as discussed above, performing the calibration method with tip 58, rather than with a separate calibration probe, precludes the need for a separate factory or manual calibration step to calibrate tip 58 relative to the probe. This also allows each print head 18 to be removed and replaced with a new print head 18 without requiring a separate calibration step to calibrate the new tip 48 relative to the probe. Instead, each print head 18 may be calibrated with its respective side target 124, allowing the calibration method to be performed in a fully automated manner.

Figure 11:
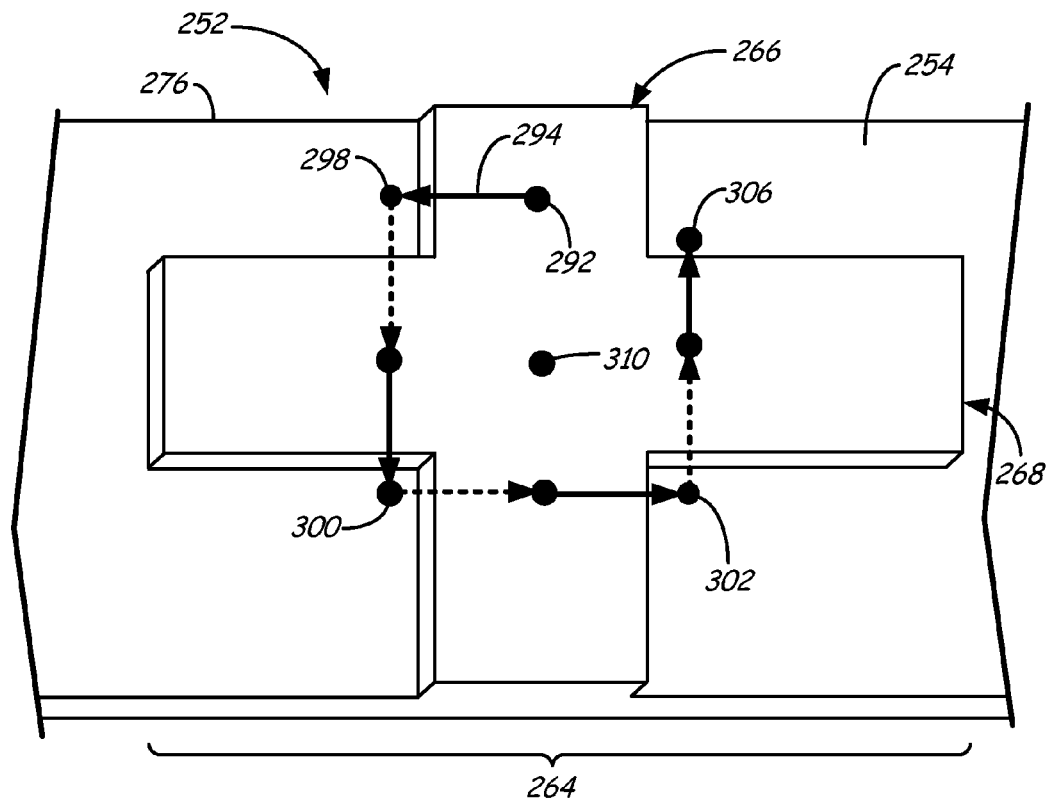
FIG. 11 is an expanded top view of an embossed portion of an alternative calibration target.

The above-discussed examples of the calibration targets (i.e., common target 52 and side targets 124) are also illustrated with grooved portions that are indented into the top surfaces. FIG. 11 illustrates calibration target 252, which is an alternative to common target 52 (and may also be an alternative to side targets 124), and where corresponding reference numbers are increased by "200". In this embodiment, grooved portion 64 is replaced with embossed portion 264, which is a portion of top surface 254 that extends higher that the remaining portion of top surface 254.

Calibration target 252 may be used in the same manner as common target 52 and/or side targets 124 to calibrate print heads 18. In this embodiment, tip 58 is lowered onto top surface 254 at embossed portion 264 (e.g., at point 292 of embossed segment 266), moved along embossed portion 264 (e.g., as illustrated by arrow 294) until tip 58 drops off of the edge of embossed portion 264 (e.g., at point 298).

This process is then repeated in the shown counter-clockwise pattern around embossed segments 266 and 268 to define points 300, 302, and 306. Controller 36 may then average the y-axis values of points 298 and 302, and average the x-axis values of points 300 and 306 to identify central point 310, which is an averaged point in the horizontal x-y plane. Controller 36 may then set central point 310 as the zeroed-coordinate location (x=0, y=0) in the horizontal x-y plane. The same steps discussed above may then be performed to calibrate print heads 18.

The above-shown calibration targets (i.e., common target 52, side targets 124, and calibration target 252) are illustrated with cross-shaped grooved portions (i.e., grooved portions 64 and 134) and cross-shaped embossed portions (i.e., embossed portion 264). However, in alternative embodiments, the calibration targets may include grooved or embossed portions with different geometries, such as X-shaped portions, L-shaped portions, V-shaped portions, other geometric shapes (e.g., circular, square, octagon, etc. . . . ), and the like. Furthermore, controller 36 may alternatively direct tips 58 to move in different patterns along planar portions 62 and 132, grooved portions 64 and 134, and embossed portion 264 from the patterns discussed above to attain the same measurements.

Although the present disclosure has been described with reference to preferred embodiments, workers skilled in the art will recognize that changes may be made in form and detail without departing from the spirit and scope of the disclosure.

The invention claimed is:

1. A method for calibrating a print head for use in an additive manufacturing system, the method comprising:
   positioning the print head at over a calibration target retained by a moveable platen of the additive manufacturing system, wherein the calibration target has a top surface with a plurality of edges;
   moving a tip of the print head along the top surface in a first direction until the tip drops off of a first edge of the plurality of edges;

identifying a first coordinate location at the first edge where the tip dropped;

moving the tip along the top surface in a second direction that is substantially perpendicular to the first direction until the tip drops off of a second edge of the plurality of edges;

identifying a second coordinate location at the second edge where the tip dropped;

determining a coordinate point of the calibration target based at least in part on the first coordinate location and the second coordinate location; and setting a calibration parameter for the print head in a horizontal plane based on the determined coordinate point.

2. The method of claim 1, and further comprising:

lowering the tip of the print head toward the top surface of the calibration target;

identifying a coordinate point along a vertical axis at which the lowered tip contacts the top surface; and setting a calibration parameter for the print head along the vertical axis based on the identified coordinate point.

3. The method of claim 1, and further comprising:

moving the tip along the top surface in a third direction that is substantially opposite of the first direction until the tip drops off of a third edge of the plurality of edges;

identifying a third coordinate location at the third edge where the tip dropped;

moving the tip along the top surface in a fourth direction that is substantially opposite of the second direction until the tip drops off of a fourth edge of the plurality of edges; and identifying a fourth coordinate location at the fourth edge where the tip dropped, wherein determining the coordinate point of the calibration target is further based on the third coordinate location and the fourth coordinate location.

4. The method of claim 3, wherein determining the coordinate point of the calibration target comprises:

averaging the first and third coordinate locations to provide a first averaged coordinate point along a first axis; and averaging the second and fourth coordinate locations to provide a second averaged coordinate point along a second axis, wherein the first axis and the second axis define the horizontal plane.

5. The method of claim 4, and further comprising:

determining a distance along the first axis between the first and third coordinate locations; and comparing the determined distance to a predetermined threshold value to determine whether an outer surface of the tip of the print head has accumulated material.

6. The method of claim 1, wherein the top surface comprises a grooved portion, wherein the first edge and the second edge are sidewall edges of the grooved portion.

7. The method of claim 6, wherein the plurality of edges of the top surface further comprise an exterior edge of the top surface, and wherein the method further comprises:

lowering the tip of the print head to bias the tip against the top surface of the calibration target at a planar portion of the calibration target that is offset from the grooved portion;

moving the biased tip in a direction that is substantially perpendicular to the exterior edge of the calibration target;

dropping the biased tip that is moving substantially perpendicular to the exterior edge off of the exterior edge;

identify the coordinate location at which the biased tip dropped edge off of the exterior edge.

8. The method of claim 1, and further comprising:

moving the tip of the print head over a second calibration target that is retained by a wall of the additive manufacturing system and is not retained by the moveable platen; and calibrating the tip of the print head relative to the second calibration target.

* * * * *